Patented Nov. 18, 1952

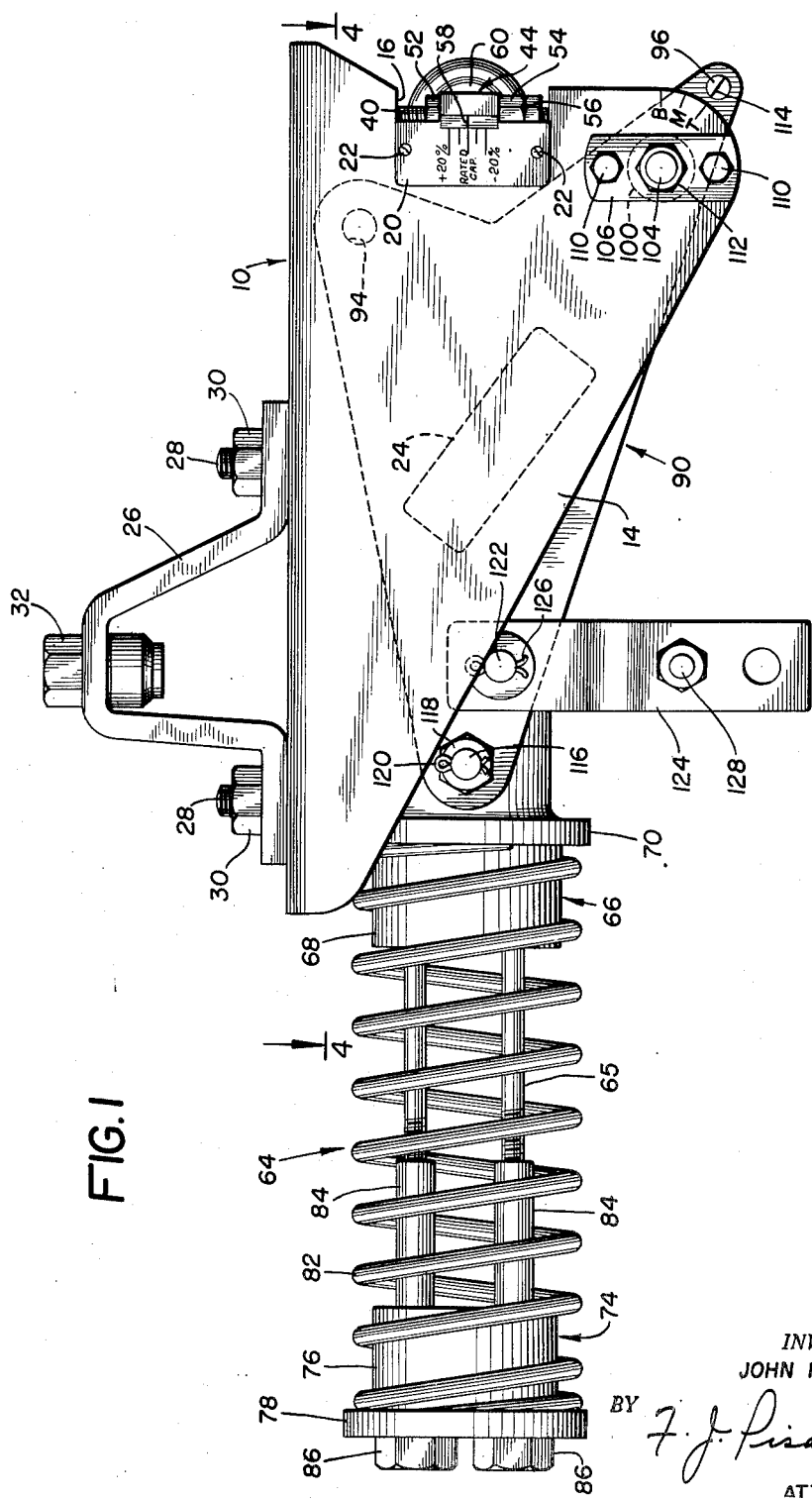

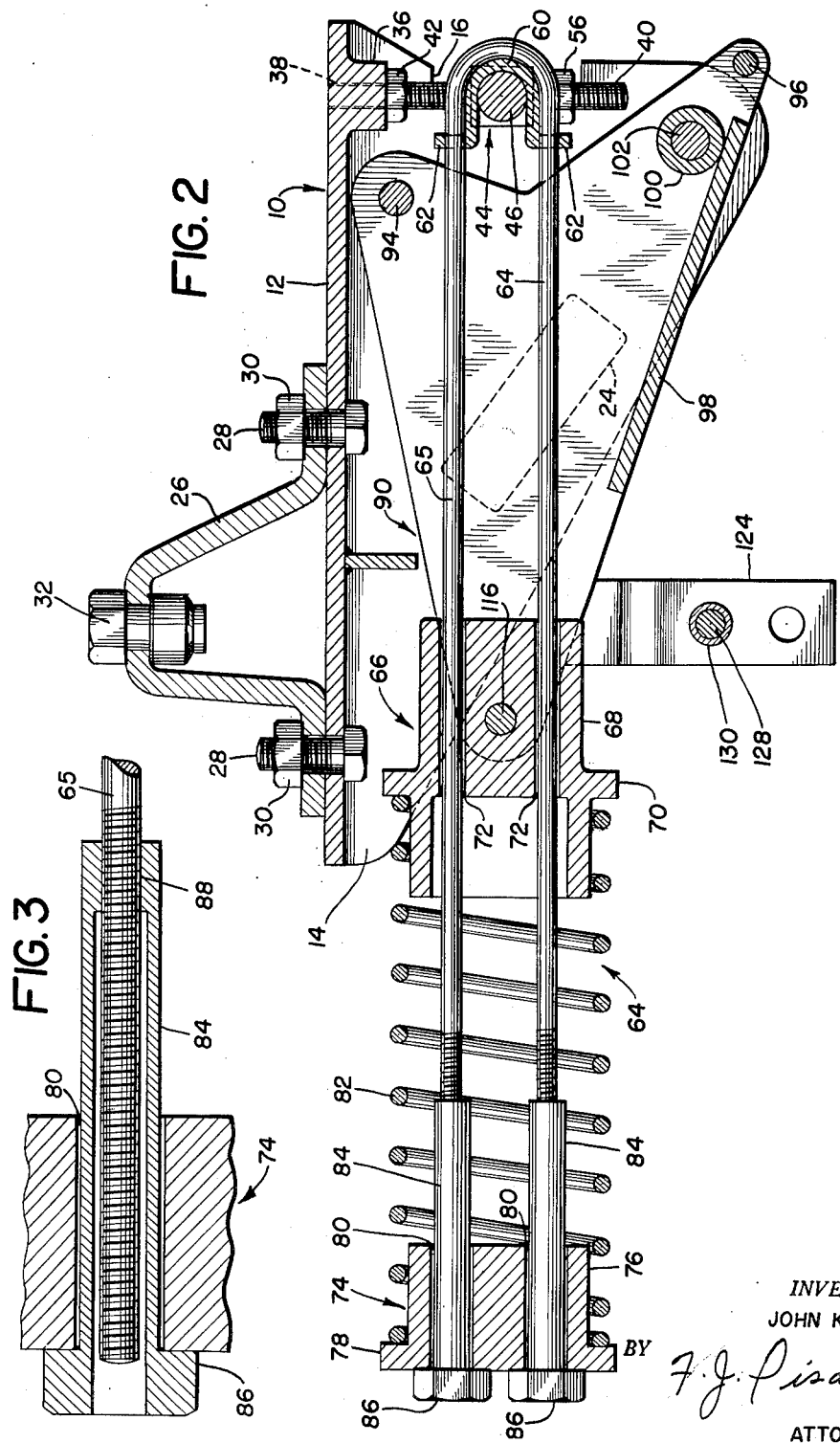

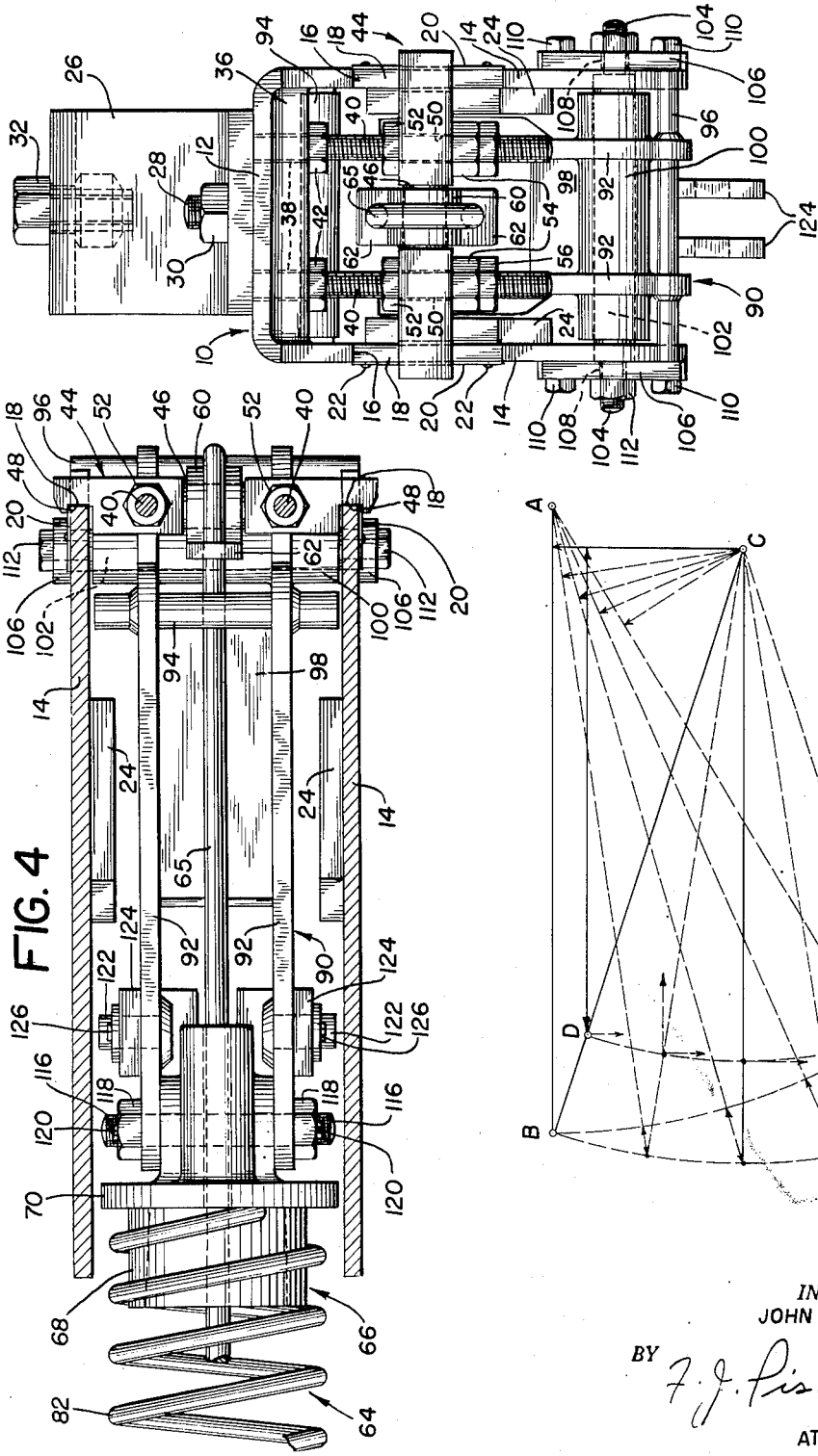

2,618,449

UNITED STATES PATENT OFFICE 2,618,449

SUPPORT DEVICE FOR PIPES OR THE LIKE

John Kohler, Delawanna, N. J., assignor, by mesne assignments, to Bergen Pipesupport Corporation, New York, N. Y., a corporation of New York Application November 21, 1949, Serial No. 128,618

11 Claims. (Cl. 248—54)

This invention relates to a support for various types of loads, including pipes or the like, and more particularly to a resilient support that is adapted to permit movement of a suspended load along the line of pull of such a load, and simultaneously subject the load to a substantially constant supporting force.

The present invention may be employed in various locales. It is especially useful in power plants and other places for supporting pipes while permitting movement of the pipes as a result of expansion or contraction thereof due to temperature changes in the material of the pipes.

Several advances have been made in comparatively recent years in the art of supporting pipes and the like. None of these advances has been generally accepted due to inherent weaknesses and limitations in design and construction.

The present invention overcomes the difficulties experienced heretofore in that it provides a relatively simple and substantially constant load support that is adapted to perform its intended functions in an entirely satisfactory manner. The support of this invention is compact and is adapted to be used in locations where available space is restricted. The support is so constructed and arranged as to permit of appreciable vertical travel to a load suspended therefrom while affording a substantially uniform supporting force to the load during such travel.

One of the features of the invention resides in arranging the parts in a manner that the support may be readily adjusted so as to successfully suspend loads that may be greater or less than the normal rated capacity of the support. Another feature of the invention is that two of the supports may be combined into a single unit, i. e., placed in series, by merely inverting one support with respect to the other and joining them together.

It is a primary object of the invention to provide an improved support for pipes or the like.

Another object of the invention is to provide a constant load type of pipe support adapted to be used in locations were vertical space is restricted.

Another object of the invention is to provide a support of the character indicated that is capable of being readily adjusted to carry loads substantially greater or less than its rated capacity.

Another object of the invention is to provide a support wherein the parts are so constructed and arranged as to permit of substantial load-travel.

A further object of the invention is to provide a resilient support for pipes and the like that is compact and sturdy in construction, reasonable in manufacturing costs, and capable of being readily assembled, adjusted and dismantled, as required.

A still further object of the invention is to provide a pipe support that is capable of performing its intended functions in an effective and trouble-free manner.

To the end that the foregoing objects may be attained, apparatus constructed in accordance with the invention preferably includes an inverted, generally U-shaped frame adapted to be secured in depending relation to a beam or other form of supporting structure. A device in the nature of a rigid plate assembly is positioned between the sides of the frame and is movable with respect to the frame about a first horizontal pivotal axis. A stop element, carried by the frame, is engageable by a pin carried by the device and serves to limit pivotal movement of the device with respect to the frame in one direction.

Also disposed between the sides of the frame is a spring mechanism that includes a member, preferably an elongated U-bolt, that is movable with respect to the frame about a second pivotal axis which is parallel to the first pivotal axis. The second pivotal axis is adapted to be shifted vertically to thereby permit the apparatus to be adjusted for a relatively wide range of loads. A pair of spring guides, consisting of a first guide and a second guide, is carried by and slidable along the U-bolt. These guides are spaced apart, the second guide being located intermediate the first guide and the second pivotal axis. The spring mechanism also includes a helical compression spring positioned between and bearing at its opposite ends against the guides. The second guide is connected to the device and movable with respect thereto about a third pivotal axis. Means are provided for moving the first guide with respect to the second guide to adjust the loading on the spring.

A load-carrying member, such as a unitary arrangement of straps, is pivotally connected to the device about an axis that is intermediate the first and third pivotal axes. The load to be carried by the apparatus is attached to the load-carrying member in suspended relation to the remainder of the apparatus.

The enumerated object, as well as other objects, together with the advantages obtainable by the use of the apparatus of this invention, will be readily understood by persons skilled in the art upon reference to the following detailed description, taken in conjunction with the annexed drawings, which respectively describe and illustrate a preferred arrangement of devices embodying the invention.

In the drawings:

Figure 1 is a view in side elevation of a support constructed in accordance with the invention;

Figure 2 is a central longitudinal vertical cross-sectional view of the apparatus shown in Figure 1;

Figure 3 is a fragmentary view in enlarged longitudinal cross section of a portion of Figure 2, and illustrates details of construction of a spring take-up sleeve;

Figure 4 is a view taken along line 4—4 of Figure 1;

Figure 5 is an end view of the apparatus as seen from the right of Figure 1; and Figure 6 is in the nature of a force diagram resulting from subjecting the apparatus to a load of the character indicated, and depicts the paths of travel of several movable pivotal axes and the relative positions of such axes with respect to certain fixed axes.

Referring now to the drawings wherein like reference numerals denote corresponding parts throughout the several views, an inverted, generally U-shaped frame 10 comprises a web 12 and a pair of parallel spaced-apart sides 14. Each side is formed with a notch 16 defined in part by a vertical rectilinear end portion 18 (Figure 5). A plate 20 is affixed to the outer face of each side by screws 22, as illustrated in Figure 1. This plate is so located and is graduated, as shown, to indicate the position of certain other parts, to be described, when the structure is assembled for use in supporting loads within the capacity range of the apparatus. Secured to the inner face of each side 14, preferably by welding, is a stop element or plate 24.

A bracket 26 is attached to frame web 12 by bolts 28 and nuts 30. This bracket serves as a means for suspending the frame from a support, such as a beam or the like, with the aid of a sleeve nut 32.

A boss 36 is integral with web 12 and projects downwardly therefrom. This boss is located above notches 16 and is tapped at 38 for the reception of corresponding bolts 40. Each bolt is provided with a nut 42 that bears against the under face of boss 36 to prevent movement of the bolt with respect to the boss.

A cross bar, generally indicated by numeral 44 and best shown in Figures 4 and 5, is formed with a cylindrical central portion 46 that constitutes a pivotal axis for parts to be described further along. The cross bar is also formed with a pair of notches 48 that register with frame end portions 18, and is provided with a pair of drill holes 50, each of which is located intermediate a corresponding notch 48 and central portion 46. Each bolt 40 extends through and below a corresponding drill hole 50. The cross bar is vertically adjustable along the bolts and is adapted to be maintained in selected position with respect to the bolts by nuts 52, 54 and 56. The cross bar has a score line 58 at each end. The position of the score lines relative to the graduations on plates 20 indicates whether the apparatus is adjusted to support a normal load or a load that is greater or less than the normal load within the rated capacity of the apparatus. An arcuate bearing member 60 is mounted on central portion 46 of the cross bar and is provided with outwardly projecting integral extensions 62.

A spring mechanism, generally indicated by numeral 64 and pivotal about the axis of cross bar central portion 46, will now be described. This mechanism includes a member, such as an elongated U-bolt 65 that bears against member 60 and extends through extensions 62 thereof. A rear spring guide 66 comprises a body 68 and a flange 70. A pair of parallel drill holes 72 in body 68 is adapted to receive the arms of U-bolt 65 and permit sliding movement of the guide with respect to the U-bolt. A forward spring guide 74 is generally similar to guide 66 and includes a body 76 having an integral flange 78 and formed with a pair of parallel drill holes 80, one of which is shown in Figure 3.

A helical compression spring 82 is carried by the U-bolt and is positioned between the guides so that its end portions bear against flanges 70 and 78, respectively, as shown in Figure 1. The loading on spring 82 may be varied or adjusted through the medium of a pair of take-up sleeves 84, each of which is provided at one end with a head 86 for actuation by a suitable tool, and is internally threaded at its other end to engage the threads of a corresponding arm of the U-bolt. It will be apparent from an examination of Figures 2 and 3 that adjustment of sleeves 84 relative to the U-bolt arms effects movement of spring guide 74 toward or away from guide 66, thereby correspondingly varying the loading on the spring, assuming of course that guide 66 is restrained against sliding movement with respect to the U-bolt.

Positioned intermediate the sides of frame 10 is a rigid plate assembly or device 90 which is pivotally connected to the frame and to spring guide 66. This assembly, which will next be described, having reference particularly to Figures 2, 4 and 5, comprises a pair of plates 92 that are maintained in the illustrated spaced-apart parallel relationship by a combined stretcher and stop pin 94, a combined stretcher and indicating pin 96, a reinforcing plate 98, and a tubular hub 100, all of which are joined together in a rigid unitary assembly by welding or in any other desired manner known to the art.

A pin 102, coaxial with hub 100 and parallel to central portion 46 of bar 44, is supported in openings in the frame sides. This pin serves as a pivot for device 90 and has an integral threaded axial extension 104 at each end. Plates 106 are tapped at 108 (Figure 5) for threaded engagement with pin extensions 104, and are secured to the frame sides by screws 110. Pin 102 is locked against rotation by nuts 112 that engage corresponding extensions 104 and bear against the outer faces of plates 106. There is a score line 114 on each end of pin 96. Each score line (Figure 1) is adapted to align with corresponding graduations on the outer face of each frame side, depending upon the angular position of device 90 with respect to the frame.

Device 90 is pivotally connected to spring guide 66 by a bolt 116 that is provided with nuts 118. Cotter pins 120 prevent accidental disengagement of nuts 118 from bolt 116.

Each of a pair of coaxial pins 122 is welded to a corresponding plate 92 and carries a depending strap or load-carrying member 124 that is free to pivot about the common axis of the pins. The straps are maintained on the pins by cotter pins 126. The lower portions of the straps are connected in spaced-apart relation through the medium of a bolt 128 and a spacer sleeve 130 (Figure 2).

For the purpose of briefly outlining the operation of the illustrated embodiment of the invention, it is first assumed that the apparatus has been assembled and the parts are in the relative position shown in Figure 1. With the parts so arranged, the apparatus is set up to support the normal load for which it is designed as score lines 58 on cross bar 44 align with corresponding graduations "Rated Cap." on plates 20. The apparatus is secured to a support by means of sleeve nut 32. The load is then connected to straps 124. The load may consist of a series of pipes that transmit a high temperature fluid. The parts are so constructed and arranged that the apparatus furnishes a substantially constant lifting force to the pipes, while permitting the pipes to move upwardly or downwardly as a result of expansion or contraction due to variations in temperature in the material of the pipes.

The balancing effect obtained by the apparatus will be readily understood by persons skilled in the art upon a consideration of the diagram of Figure 6. In the diagram, A denotes the axis of cross bar central portion 46 which is the pivotal axis of U-bolt 65 with respect to frame 10; B denotes the axis of bolt 116 which is the pivotal axis of device 90 with respect to spring guide 66; C denotes the axis of pin 102 which is the pivotal axis of device 90 with respect to the frame; and D denotes the common axis of pins 122 which is the pivotal axis of load-carrying straps 124 with respect to device 90.

The load suspended from the apparatus at axis D results in a rotational moment about axis C. This moment is opposed by a moment of equal magnitude produced by the force of spring 82 between axes A and B about axis C. Axis A is so located with respect to the other axes that at any point on the arc described by axis B in the course of counter-clockwise pivotal movement of spring mechanism 64 and device 90 with respect to frame 10, the two rotational moments are substantially balanced. On downward movement of axes B and D along their corresponding arcuate paths, the resulting corresponding increased loading on spring 82 is compensated for by a proportional decrease in distance between the line of action of the spring force and axis C, and the rotational moment remains substantially unchanged. The rotational moment remains substantially unchanged on upward movement of axes B and D along their arcuate paths for the reason that the resulting corresponding decreased loading on the spring is compensated for by a proportional increase in the distance between the line of action of the spring force and axis C.

From the foregoing, it is believed that the construction, operation and advantages of my present invention will be readily comprehended by persons skilled in the art. It is to be clearly understood, however, that various changes in the apparatus set forth above may be made without departing from the scope of the invention, it being intended that all matter contained in the description or shown in the drawings shall be interpreted as illustrative only and not in a limiting sense.

I claim:

1. In apparatus of the character described, a device pivotally connected to the frame, a spring mechanism comprising a member pivotally connected to the frame, a spring carried by the member, and means for adjusting the loading on the spring, said spring mechanism being connected to the device intermediate the spring and the pivotal connection between the member and the frame, and a load-carrying member pivotally connected to the device intermediate the connections between the device and the frame and between the device and the spring mechanism.

2. In apparatus of the character described, a frame, a device connected to the frame and movable with respect thereto about a first pivotal axis, and a single spring mechanism comprising a member connected to the frame and movable with respect thereto about a second pivotal axis, a single spring carried by the member, said spring being stressed in compression and independent of the frame, and means for adjusting the loading on the spring, said spring mechanism being connected to the device and movable with respect thereto about a third pivotal axis.

3. In apparatus of the character described, a frame, a device connected to the frame and movable with respect thereto about a first pivotal axis, a single spring mechanism comprising a member connected to the frame and movable with respect thereto about a second pivotal axis, a single spring carried by the member, said spring being stressed in compression and independent of the frame, and means for adjusting the loading on the spring, said spring mechanism being connected to the device and movable with respect thereto about a third pivotal axis, and a load-carrying member pivotally connected to the device and movable with respect thereto about a pivotal axis that is intermediate the first and third pivotal axes.

4. In apparatus of the character described, a frame, a device connected at one end to the frame and movable with respect thereto about a first pivotal axis, a spring mechanism comprising a member connected to the frame and movable with respect thereto about a second pivotal axis that is parallel and shiftable with respect to the first pivotal axis, a pair of spaced spring guides carried by and slidable along the member and consisting of a first guide and a second guide intermediate the first guide and the second pivotal axis, a spring positioned between and bearing against the guides, said second guide being connected to the other end of the device and movable with respect thereto about a third pivotal axis, and means for moving the first guide with respect to the second guide to adjust the loading on the spring, and a load-carrying member pivotally connected to the device and movable with respect thereto about a pivotal axis that is intermediate the first and third pivotal axes.

5. In apparatus of the character described, a frame, a member pivotally connected to the frame, a pair of spaced spring guides movable along the member and disposed to one side of the pivotal connection between the member and the frame, a spring positioned between the guides, a device pivotally connected at one end to the frame and connected at its other end to one of the guides, and means for moving one guide with respect to the other to adjust the loading on the spring.

6. In apparatus of the character described, a frame, a member pivotally connected to the frame, a pair of spaced spring guides carried by and slidable with respect to the member, a spring positioned between the guides, and a device pivotally connected at its opposite ends to the frame and one of the guides, respectively.

7. An apparatus in accordance with claim 6, including a load-carrying member pivotally connected to the device intermediate the pivotal connections between the device and the frame and said one of the guides.

8. In apparatus of the character described, a frame, a member pivotally connected to the frame, a pair of spaced spring guides carried by and slidable with respect to the member and consisting of a first guide and a second guide intermediate the first guide and the pivotal connection between the member and the frame, a spring positioned between the guides, a device pivotally connected at its opposite ends to the frame and the second guide, respectively, and means for moving the first guide with respect to the second guide to adjust the loading on the spring.

9. Apparatus in accordance with claim 3, including a load-carrying member pivotally connected to the device intermediate the pivotal connections between the device and the frame and the second guide.

10. In apparatus of the character described, an inverted, generally U-shaped frame, means for suspending the frame from a support, a device disposed between the sides of the frame and movable with respect thereto about a first pivotal axis, a stop element carried by the frame, a pin carried by the device and engageable by the stop element to limit movement of the device about the first pivotal axis in one direction, a single spring mechanism comprising a member connected to the frame and movable with respect thereto about a second pivotal axis, a single spring carried by the member, said spring being stressed in compression and independent of the frame, and means for adjusting the loading on the spring, said spring mechanism being connected to the device and movable with respect thereto about a third pivotal axis, and a load-carrying member pivotally connected to the device and movable with respect thereto about a pivotal axis that is intermediate the first and third pivotal axes.

11. In apparatus of the character described, an inverted, generally U-shaped frame, means for suspending the frame from a support, a device disposed between the sides of the frame and movable with respect thereto about a first pivotal axis, a stop element carried by the frame, a pin carried by the device and engageable by the stop element to limit movement of the device about the first pivotal axis in one direction, a spring mechanism comprising a member connected to the frame and movable with respect thereto about a second pivotal axis that is parallel and shiftable with respect to the first pivotal axis, a pair of spaced spring guides carried by and slidable along the member and consisting of a first guide and a second guide intermediate the first guide and the second pivotal axis, a spring positioned between and bearing against the guides, said second guide being connected to the other end of the device and movable with respect thereto about a third pivotal axis, and means for moving the first guide with respect to the second guide to adjust the loading on the spring, and a load-carrying member pivotally connected to the device and movable with respect thereto about a pivotal axis that is intermediate the first and third pivotal axes.

JOHN KOHLER.

REFERENCES CITED

The following references are of record in the file of this patent:

UNITED STATES PATENTS

| Number | Name | Date |
| --- | --- | --- |
| 2,208,064 | Wood | July 16, 1940 |
| 2,256,784 | Wood | Sept. 23, 1941 |
| 2,480,864 | Loepsinger | Sept. 6, 1949 |
| 2,535,305 | Loepsinger | Dec. 26, 1950 |
| 2,568,149 | Grabe | Sept. 18, 1951 |